United States Patent
Yatake et al.

(10) Patent No.: US 9,353,276 B2
(45) Date of Patent: May 31, 2016

(54) INK COMPOSITION AND RECORDING APPARATUS

(71) Applicant: Seiko Epson Corporation, Tokyo (JP)

(72) Inventors: Masahiro Yatake, Shiojiri (JP); Takayoshi Kagata, Shiojiri (JP); Hiroshi Mukai, Shiojiri (JP); Akira Mizutani, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/632,202

(22) Filed: Feb. 26, 2015

(65) Prior Publication Data
US 2015/0247045 A1  Sep. 3, 2015

(30) Foreign Application Priority Data
Feb. 28, 2014 (JP) ................... 2014-038426

(51) Int. Cl.
| | |
|---|---|
| C09D 11/322 | (2014.01) |
| C09D 11/106 | (2014.01) |
| C09D 11/107 | (2014.01) |
| B41J 2/01 | (2006.01) |
| C09D 11/30 | (2014.01) |

(52) U.S. Cl.
CPC ............... C09D 11/322 (2013.01); B41J 2/01 (2013.01); C09D 11/106 (2013.01); C09D 11/107 (2013.01); C09D 11/30 (2013.01)

(58) Field of Classification Search
CPC ....... B41J 2/01; C09D 11/106; C09D 11/107; C09D 11/30; C09D 11/322
USPC ........................................................... 347/20
See application file for complete search history.

(56) References Cited

U.S. PATENT DOCUMENTS

| | | | | |
|---|---|---|---|---|
| 6,737,449 B1 * | 5/2004 | Yatake | .................. | B41J 2/1606 106/31.6 |
| 2011/0001775 A1 * | 1/2011 | Nishiwaki | .............. | C09D 11/40 347/9 |
| 2011/0318551 A1 * | 12/2011 | Nakagawa | ............... | B01J 13/02 428/206 |

(Continued)

FOREIGN PATENT DOCUMENTS

| | | |
|---|---|---|
| EP | 0796901 A2 | 9/1997 |
| EP | 2423274 A1 | 2/2012 |
| EP | 2423275 A1 | 2/2012 |

(Continued)

OTHER PUBLICATIONS

Extended European Search Report for Application No. EP 15 15 6945 dated May 22, 2015 (9 pages).

(Continued)

*Primary Examiner* — Manish S Shah
*Assistant Examiner* — Roger W Pisha, II
(74) *Attorney, Agent, or Firm* — Harness, Dickey & Pierce, P.L.C.

(57) ABSTRACT

Disclosed herein is an ink composition, including: a color material; water; and a polymer particle, in which the polymer particle has a core-shell structure including a core polymer and a shell polymer, in which the polymer particle has an average particle diameter of 10 nm to 80 nm, in which the core polymer has a glass transition temperature of lower than 60° C. and the shell polymer has a glass transition temperature of higher than or equal to 60° C., and in which the core polymer includes an aromatic monomer having at least a vinyl group as a constitutional unit.

24 Claims, 1 Drawing Sheet

(56) References Cited

U.S. PATENT DOCUMENTS

2012/0050388 A1 3/2012 Nishiguchi et al.
2013/0072614 A1* 3/2013 Lindstrom ............ C09D 11/40
 524/388

FOREIGN PATENT DOCUMENTS

| JP | 2002-012802 A | 1/2002 |
| JP | 2008-088427 A | 4/2008 |
| JP | 2012-025947 A | 2/2012 |
| JP | 2012-072354 A | 4/2012 |
| JP | 2012-092224 A | 5/2012 |

OTHER PUBLICATIONS

XP-002739324, Database WPI, Week 201151, Thomson Scientific, London, GB, AN 2011-J56896, XP-002739324 and JP 2011-144334A (Toyo Ink Manufacturing Co., Ltd.), Jul. 28, 2011 (2 pages).

* cited by examiner

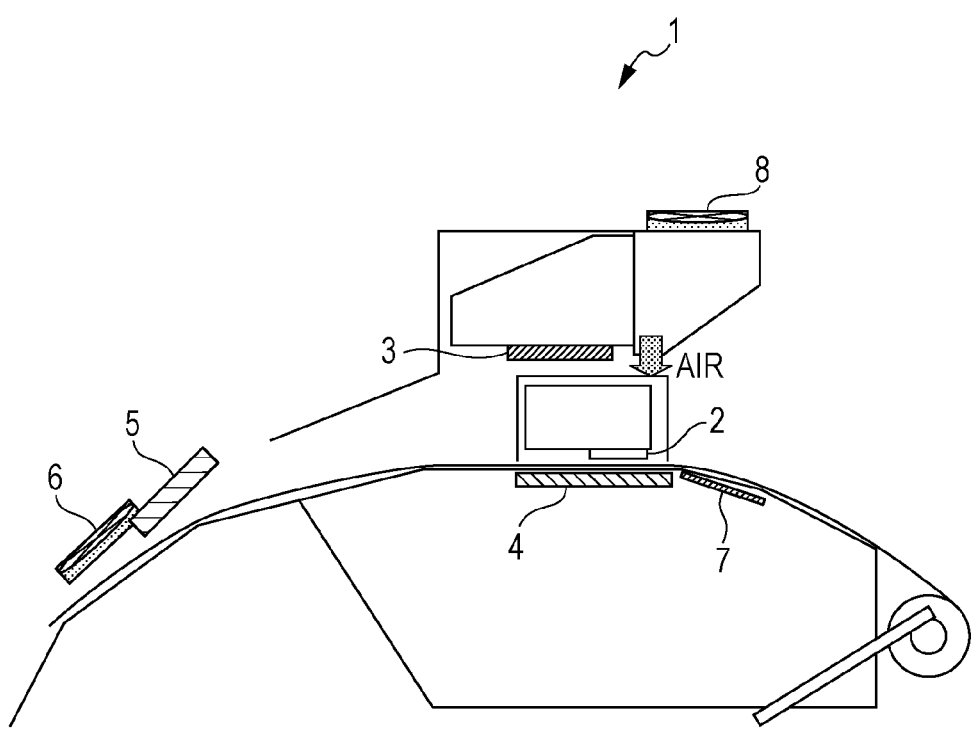

INK COMPOSITION AND RECORDING APPARATUS

BACKGROUND

1. Technical Field

The present invention relates to an ink composition and a recording apparatus.

2. Related Art

A resin emulsion in the related art is a core-shell type resin emulsion. A study on a core-shell type resin emulsion having a structure in which core part is made of a thermoplastic resin and shell part is made of a resin having a three-dimensional crosslinked structure has been conducted in order that the storage stability of a recorded image is excellent, if necessary, the recorded image can be easily erased from a recording medium, and the recording medium can be suitably repeatedly used (JP-A-2002-12802). In addition, a study on a core-shell type resin emulsion having a structure in which a core made of an acryl-based resin is covered with a polycarbonate-based urethane resin shell has been conducted in order to obtain an ink having excellent ejection stability and storage stability and excellent image toughness such as marker resistance, abrasion resistance, or the like (JP-A-2012-25947). Further, a study on a resin emulsion having a core-shell structure in which an outer layer is made of a urethane resin and an inner layer is made of an acrylic resin has been conducted in order to obtain an ink capable of being printed even on an ink non-absorptive material such as plastic, metal, or the like and having excellent adhesivity, film forming properties, and chemical resistance (JP-A-2012-92224). Furthermore, a study on a tri-block polymer, although different from a core-shell type resin emulsion, has been conducted in order to provide an aqueous ink for an ink jet having excellent storage stability and ejection stability and high abrasion resistance of an image (JP-A-2012-72354).

However, in the ink disclosed in JP-A-2002-12802, fixability cannot be obtained because the shell part has a crosslinked structure, and in the ink disclosed in JP-A-2012-25947, it is difficult to improve fixability and obtain clogging recovery properties because the shell part is made of a polycarbonate-based urethane resin. Even in the ink disclosed in JP-A-2012-92224, it is difficult to improve fixability and obtain clogging recovery properties because the shell part is made of urethane. Moreover, since the ink disclosed in JP-A-2012-72354 has a tri-block structure, ejection stability is obtained selectively, but it is difficult to obtain clogging recovery properties.

SUMMARY

An advantageous of some aspects of the invention is to provide an ink composition having excellent fixability and frictional resistance and having excellent clogging recovery properties to improve ejection stability, and a recording apparatus.

The present inventors have conducted intensive studies. As a result, the invention has been completed by defining the particle diameter of a monomer or core-shell.

According to an aspect of the invention, there is provided an ink composition, including: a color material; water; and a polymer particle, in which the polymer particle has a core-shell structure including a core polymer and a shell polymer, the polymer particle has an average particle diameter of 10 nm to 80 nm, the core polymer has a glass transition temperature of lower than 60° C., the shell polymer has a glass transition temperature of higher than or equal to 60° C., and the core polymer includes an aromatic monomer having at least a vinyl group as a constitutional unit.

According to the ink composition of the aspect of the invention, it is difficult to form a large lump even when this ink composition is aggregated, and thus it is possible to suppress the clogging of nozzles.

In addition, by setting the glass transition temperature of the core polymer to be lower than 60° C., the core polymer can be easily discharged after the shell polymer is softened, and thus there is a tendency of the ink composition to have more excellent adhesivity.

Further, by setting the glass transition temperature of the shell polymer to be higher than or equal to 60° C., when the ink composition is ejected under a high-temperature environment, it is possible to eject the polymer particles from a recording head without disrupting a core-shell type structure, and it is possible to further suppress the deposition of the polymer particles in nozzles, so that the clogging of nozzles can be prevented, and the stability of the ink composition in intermittent printing tends to become more excellent. When a film is formed on the recording medium, the ink composition on the recording medium is heated to a temperature higher than the glass transition temperature of the shell polymer, and thus the core polymer is discharged from the softened shell polymer, thereby forming a film on the recording medium by the core polymer and the shell polymer. At this time, the softened core polymer spreads and adheres onto the recording medium, thereby forming a film having excellent fixability.

Moreover, since the core polymer includes an aromatic monomer having at least a vinyl group as a constitutional unit, the core polymer can form a hydrophobic film, thereby improving the frictional resistance, more specifically, water friction resistance of the recorded image.

Preferably, the ink composition of the aspect of the invention is recorded on the heated recording medium. Particularly, even when recording is performed in a heated state, ejection stability can be improved, and simultaneously the fixability and printing durability of the recorded image can be improved.

Preferably, the shell polymer includes an aromatic monomer as a constitutional unit. The shell polymer has an acid value, and the core polymer does not have an acid value. When the shell polymer includes an aromatic monomer as a constitutional unit, a detailed action mechanism is unknown, but ejection bending is prevented. In particular, in the case of small dots, ink droplets easily bend. Therefore, according to the aspect of the invention, ejection bending is suppressed.

Preferably, the polymer particle is synthesized without substantially using an emulsifier. Here, the "emulsifier" means a surfactant used in synthesis. The ink composition containing the polymer particles synthesized using such an emulsifier is problematic in that foaming easily occurs, the gloss of an image hardly appears, and foreign matter is easily generated. According to the aspect of the invention, the ink composition for overcoming the above problem is obtained.

Preferably, the ink composition includes a cyclic nitrogen compound or an aprotic polar solvent, and the recording medium is made of polyvinyl chloride. When the ink composition includes a cyclic nitrogen compound or an aprotic polar solvent, it is possible to shift the glass transition temperature of the apparent polymer particles to a low-temperature region, and it is possible to soften the core polymer and the shell polymer at a temperature lower than the original temperature, thereby improving the fixability of the ink composition onto the recording medium. Thus, in particular, when the recording medium is made of polyvinyl chloride, it is possible to improve the fixability of the ink composition onto the recording medium.

For example, the core polymer includes a nitrogen-containing monomer, and the recording medium is made of polypropylene, polyethylene terephthalate, nylon, or polyethylene. When the core polymer includes a nitrogen-containing monomer, it is possible to increase the polarity of the core polymer. In particular, when the recording medium is made of polypropylene, polyethylene terephthalate, nylon, or polyethylene, it is possible to improve the fixability of the film of the core polymer.

For example, the shell polymer includes (meth)acrylic acid as a constitutional unit. Therefore, a hydrophilic shell polymer can be formed by polymerization.

Preferably, the shell polymer has an acid value of 20 mgKOH/g to 120 mgKOH/g. When the acid value of the shell polymer is within the above range, sufficient hydrophilicity necessary for the shell polymer can be secured.

According to another aspect of the invention, there is provided a recording apparatus, including: the above-described ink composition; and an ejection head for ejecting this ink composition.

For example, the ejection head includes nozzles for ejecting the ink composition, and dots of the ink composition can be ejected in a multi-size from one of the nozzles.

BRIEF DESCRIPTION OF THE DRAWINGS

The invention will be described with reference to the accompanying drawing, wherein like numbers reference like elements.

FIGURE is a schematic view showing a schematic configuration of an ink jet recording apparatus according to the present embodiment.

DESCRIPTION OF EXEMPLARY EMBODIMENTS

Hereinafter, preferred embodiments of the invention will be described in detail. However, the invention is not limited to the following embodiments. Various modifications can be made within the scope not departing from the gist thereof.
Ink Composition The ink composition according to the present embodiment includes: a color material; water; and a polymer particle, in which the polymer particle has a core-shell structure including a core polymer and a shell polymer, the polymer particle has an average particle diameter of 10 nm to 80 nm, the core polymer has a glass transition temperature of lower than 60° C., the shell polymer has a glass transition temperature of higher than or equal to 60° C., and the core polymer includes an aromatic monomer having at least a vinyl group as a constitutional unit.
Color Material The color material is selected from pigments and dyes.
Pigment In the present embodiment, when a pigment is used as the color material, it is possible to improve the light resistance of ink. As the pigment, any one of inorganic pigments and organic pigments may be used.

The inorganic pigment is not particularly limited, but examples thereof include carbon black, iron oxide, titanium oxide, and silica oxide. These inorganic pigments may be used alone or in a combination of two or more thereof.

The organic pigment is not particularly limited, but examples thereof include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. Specific examples of the organic pigment are exemplified as follows.

The pigment used in black ink is not particularly limited, but an example thereof includes carbon black. Carbon black is not particularly limited, but examples thereof include furnace black, lamp black, acetylene black, and channel black (C.I. Pigment Black 7). Further, the commercially available product of carbon black is not particularly limited, but examples thereof include No. 2300, No. 900, MCF88, No. 20B, No. 33, No. 40, No. 45, No. 52, MA7, MA8, MA100, and No. 2200B (all are trade names, manufactured by Mitsubishi Chemical Corporation); Color Black FW1, Color Black FW2, Color Black FW2V, Color Black FW18, Color Black FW200, Color Black 5150, Color Black 5160, Color Black 5170, Pritex 35, Pritex U, Pritex V, Pritex 140U, Special Black 6, Special Black 5, Special Black 4A, Special Black 4, Special Black 250, or the like (all are trade names, manufactured by Degussa AG); Conductex SC, Raven 5750, Raven 5250, Raven 5000, Raven 3500, Raven 1255, Raven 700, or the like (all are trade names, manufactured by Columbian Carbon Japan Ltd.); and Regal 400R, Regal 330R, Regal 660R, Mogul L, Monarch 700, Monarch 800, Monarch 880, Monarch 900, Monarch 1000, Monarch 1100, Monarch 1300, Monarch 1400, Elftex 12 or the like (all are trade names, manufactured by CABOT Corporation).

Examples of the pigment used in cyan ink include C. I. Pigment Blues 1, 2, 3, 15, 15:1, 15:2, 15:3, 15:4, 15:6, 15:34, 16, 18, 22, 60, 65, and 66; and C. I. Bat Blues 4 and 60. Among these, at least one of C. I. Pigment Blues 15:3 and 15:4 is preferable.

Examples of the pigment used in magenta ink include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:4, 57, 57:1, 88, 112, 114, 122, 123, 144, 146, 149, 150, 166, 168, 170, 171, 175, 176, 177, 178, 179, 184, 185, 187, 202, 209, 219, 224, 245, 254, and 264; and C. I. Pigment Violets 19, 23, 32, 33, 36, 38, 43, and 50. Among these, one or more selected from the group consisting of C. I. Pigment Red 122, C. I. Pigment Red 202, and C. I. Pigment Violet 19 is preferable.

Examples of the pigment used in yellow ink include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. Among these, one or more selected from the group consisting of C. I. Pigment Yellows 74, 155, and 213 is preferable.

Examples of the pigment used in white ink include, but are not particularly limited to, C. I. Pigment Whites 6, 18, and 21, titanium oxide, zinc oxide, zinc sulfide, antimony oxide, zirconium oxide, white hollow resin particles, and polymer particles.

In addition, as the pigments used in color inks such as green ink, orange ink and the like, except for the above colors, commonly known pigments are used.
Dye In the present embodiment, a dye is used as the color material. The dye is not particularly limited, but examples thereof include acidic dyes, direct dyes, reactive dyes, and basic dyes.

The content of the color material is preferably 0.4 mass % to 12 mass %, and more preferably 2 mass % to 5 mass %, based on the total mass (100 mass %) of ink.

Water

The ink composition according to the present embodiment includes water. Examples of water include pure water, such as ion exchange water, ultrafiltered water, reverse osmosis water, and distilled water; and ultrapure water which is obtained by completely removing ionic impurities as much as possible. In addition, when water sterilized by ultraviolet irradiation or addition of hydrogen peroxide is used, it is possible to prevent the occurrence of mold and bacteria in the case where a pigment dispersion liquid and an ink using the same are stored for a long period of time.

The content of water is not particularly limited, and may be appropriately determined as necessary.

Polymer Particle

The polymer particle has a core-shell structure including a core polymer and a shell polymer and has an average particle diameter of 10 nm to 80 nm. Here, the core polymer has a glass transition temperature of lower than 50° C., and the shell polymer has a glass transition temperature of higher than or equal to 50° C. Further, the core polymer includes an aromatic monomer having at least a vinyl group as a constitutional unit.

The core-shell structure refers to a structure in which a core polymer is formed in the void of a shell polymer. Therefore, the core-shell structure includes not only a structure in which the surface of the core polymer is covered with the shell polymer, but also a structure in which a part of the void of a three-dimensional network structure caused by the shell polymer is filled with the core polymer. Accordingly, the core-shell structure in the present specification includes a structure of a polymer particle in which the boundary between the core part and the shell part are not exactly clear.

The glass transition temperature of the core polymer is lower than 60° C., and preferably higher than or equal to 0° C. and lower than 60° C. When the glass transition temperature of the core polymer is lower than 60° C., the core polymer can be easily discharged after the shell polymer is softened, and thus the ink composition has more excellent adhesivity. In addition, when the glass transition temperature of the core polymer is higher than or equal to 0° C., the storage stability of the ink composition is excellent.

The glass transition temperature of the shell polymer is higher than or equal to 60° C., and preferably higher than or equal to 60° C. and lower than or equal to 150° C. When the glass transition temperature of the shell polymer is higher than or equal to 60° C., in the case where the ink composition is ejected under a high-temperature environment, it is possible to eject the polymer particles from a recording head without disrupting a core-shell type structure, and it is possible to further suppress the deposition of the polymer particles in nozzles, so that the clogging of nozzles can be prevented, and the stability of the ink composition in intermittent printing tends to become more excellent. In the case where a film is formed on the recording medium, the ink composition on the recording medium is heated to a temperature higher than the glass transition temperature of the shell polymer, and thus the core polymer flows out from the shell polymer, thereby forming a film on the recording medium by the core polymer and the shell polymer. At this time, the softened core polymer spreads and adheres onto the recording medium, thereby forming a film having excellent fixability. Further, when the glass transition temperature of the shell polymer is lower than or equal to 150° C., the shell polymer on the recording medium is easily softened, and thus the adhesivity of the ink composition tends to become excellent. Meanwhile, when the glass transition temperature of the shell polymer is higher than 150° C., the thermal deformation property of the emulsion type resin becomes poor, thus making a negative influence such as thickening or the like on the system.

When the average particle diameter of the polymer particles is 10 nm to 80 nm, which is relatively small, the ink composition is characterized in that the gloss of the recorded image easily appears, and excellent film forming properties are exhibited. In addition, when the average particle diameter of the polymer particles is relatively small, a large lump is hardly formed even when the polymer particles are aggregated, and thus it is possible to suppress the clogging of nozzles. Further, when the average particle diameter of the polymer particles is small, the viscosity of the ink composition can be increased relatively high, and thus it is possible to prevent the viscosity of the ink composition from being lowered to such a degree that ink ejection properties becomes unstable, even when the temperature of the ink composition rises in the recording head. Moreover, in the present specification, the average particle diameter is based on volume unless otherwise specified. For example, the average particle diameter may be measured by a particle size distribution analyzer using a laser diffraction scattering method as a measurement principle. An example of the particle size distribution analyzer includes a particle size distribution meter (for example, Microtrac UPA, manufactured by Nikkiso Co., Ltd.) using a dynamic light scattering method as a measurement principle.

Glass transition temperature (hereinafter, referred to as "Tg") is calculated by using an analysis method such as viscoelasticity measurement, thermal analysis or the like, or by using a calculation formula based on Tg of homopolymer of commonly known polymerizable monomers. When the resin included in the core polymer and the following shell polymer is a copolymer, the glass transition temperature (Tg) of the copolymer can be calculated by the following FOX Equation based on $Tg_n$ (unit: K) of hompolymer and mass fraction ($W_n$) of monomer.

$$\frac{1}{Tg} = \frac{W_1}{Tg_1} + \frac{W_2}{Tg_2} + \ldots + \frac{W_n}{Tg_n} \qquad \text{Equation 1}$$

Here, $W_n$: mass fraction of each monomer, $Tg_n$: Tg of homopolymer of each monomer (unit: K), and Tg: Tg of copolymer (unit: K).

In other words, when a polymer is a homopolymer, the glass transition temperature of the core polymer or the shell polymer can be controlled by selecting the homopolymer. In addition, when a polymer is a copolymer, the glass transition temperature thereof can be controlled by considering Tg of the above homopolymer and the above FOX Equation.

Core Polymer

The core polymer is designed to be a highly hydrophobic polymer. Therefore, it is preferred that the core polymer do not have an acid value. In addition, the core polymer includes an aromatic monomer having at least a vinyl group as a constitutional unit. Therefore, the core polymer becomes hydrophobic, and thus a hydrophobic film can be formed. As a result, it is possible to improve water friction resistance that is one of the frictional resistances of a recorded image.

The aromatic monomer having a vinyl group is not particularly limited, but examples thereof include styrene, α-methyl styrene, p-methyl styrene, vinyl toluene, chlorostyrene, and divinyl benzene.

In addition, it is preferred that the core polymer include a nitrogen-containing monomer as a constitutional unit. When the core polymer includes a nitrogen-containing monomer, it is possible to increase the polarity of the core polymer, and particularly, the fixability of the film of the core polymer can be improved when the recording medium is made of polypropylene, polyethylene terephthalate, nylon, or polyethylene.

The nitrogen-containing monomer is not particularly limited, but examples thereof include (meth)acrylamide, (meth)acrylonitrile, N-alkoxymethyl(meth)acrylamide, alkyl(meth)acrylamides, dialkyl(meth)acrylamide, dialkylaminopropyl(meth)acrylamide, and hydroxyalkyl(meth)acrylamide.

Shell Polymer

The shell polymer is not particularly limited in its raw material if its glass transition temperature is lower than 60° C., but preferably it includes an aromatic monomer as a constitutional unit. When the shell polymer includes an aromatic monomer as a constitutional unit, a detailed action mechanism is unknown, but the ejection bending is prevented. In particular, in the case of small dots, ink droplets easily bend, and thus ejection bending is suppressed according to an aspect of the invention. Therefore, the ink composition according to an aspect of the invention is particularly suitable for a head that can eject ink dots in a multi-size from one nozzle.

The aromatic monomer is not particularly limited, but examples thereof include styrene, α-methyl styrene, p-methyl styrene, vinyl toluene, chlorostyrene, and divinyl benzene, each of which is an aromatic monomer having a vinyl group. In addition, the aromatic monomer may be an aromatic monomer having no vinyl group.

Preferably, the shell polymer includes (meth)acrylic acid as a constitutional unit. Therefore, hydrophilicity becomes high to improve the dispersion stability of polymer particles, and simultaneously the viscosity of the ink composition becomes relatively low to improve the ejection stability of the ink composition. In addition, the polymer particles according to the present embodiment are synthesized without substantially using an emulsifier as described later. When the shell polymer includes (meth)acrylic acid as a constitutional unit, it is possible to form a hydrophilic shell polymer having a void, and it is possible to form a hydrophobic core polymer in this void.

The shell polymer has an acid value because it is hydrophilic. Preferably, the shell polymer has an acid value of 20 mgKOH/g to 120 mgKOH/g. When the acid value of the shell polymer is within the above range, sufficient hydrophilicity necessary for the shell polymer can be secured.

The weight average molecular weight of the shell polymer is not particularly limited, but is, for example, more than or equal to 10,000 and less than or equal to 100,000.

The core polymer and the shell polymer may use one homopolymer or a combination of two or more homopolymers as the constitutional unit.

In the ratio of the mass of the core polymer to the mass of the shell polymer in the polymer particle, preferably the mass of the core polymer≤the mass of the shell polymer, and more preferably the mass of the core polymer<the mass of the shell polymer. Still more preferably, the mass of the core polymer is 40% to 80% when the mass of the shell polymer is 100%. For this reason, the balance between the mass of the core polymer and the mass of the shell polymer becomes good, so that the fixability of the ink composition is good, the ejection stability of the ink composition is excellent, and vertical misalignment tends to hardly occur. The vertical misalignment refers to a phenomenon that, in the continuous ejection of ink, ink is partially solidified around a nozzle by long-term ejection, and thus clear vertical lines cannot be printed due to curved ejection direction.

Method of Forming Polymer Particles

There is no limitation to the formation method of the above-mentioned polymer particles, but preferably, the polymer particles are formed by soap-free polymerization without substantially using an emulsifier. The soap-free polymerization refers to a polymerization process for forming a core-shell polymer without substantially using an emulsifier. Here, the "emulsifier" means a surfactant used in synthesis. Further, an example of the soap-free polymerization includes a process of polymerizing polymer particles under the condition of the content of an emulsifier in a solution being less than or equal to 1 mass %. In the related art, the ink composition containing the polymer particles synthesized using such an emulsifier is problematic in that foaming easily occurs, the gloss of an image is difficult to appear, and foreign matter is easily generated. According to an aspect of the invention, an ink composition that suppresses the occurrence of such problems can be obtained. In the soap-free polymerization, for example, a shell polymer containing (meth)acrylic acid as a constitutional unit is formed, and a core polymer is formed in the shell polymer. Moreover, when polymer particles are formed using soap-free polymerization, the average particle diameter of the polymer particles becomes very small, and the ejection stability and glossiness of an ink composition are improved.

The surfactant used in synthesis is not particularly limited, but an anionic surfactant and a nonionic surfactant are preferable. Examples of the anionic surfactant include sodium dodecylbenzene sulfonate, sodium laurate, and ammonium salts of polyoxyethylene alkyl ether sulfate. Examples of the nonionic surfactant include polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides. The core-shell polymer used in the present embodiment is prepared without using these surfactants.

The polymerization initiator used in the soap-free polymerization is not particularly limited, but is preferably a hydrophilic polymerization initiator. Examples thereof include potassium persulfate, ammonium persulfate, hydrogen peroxide, and the like.

An example of the soap-free polymerization method will be described, but a synthesis method is not limited to the following method. For example, ion exchange water and a polymerization initiator are put into a polymerization reactor provided with a jacket, and the pressure in the polymerization reactor is reduced to remove oxygen, and then the pressure therein is set to atmospheric pressure with nitrogen to make a nitrogen atmosphere. First, under the nitrogen atmosphere, the temperature in the polymerization reactor is set to predetermined temperature, and then a pre-emulsion solution containing monomers (to become a constituent of a shell polymer) is dropped by a predetermined amount to perform a polymerization reaction to thus synthesize a shell polymer. Next, a core polymer is obtained by polymerizing the monomers using the void of the obtained shell polymer as a polymerization field, thereby synthesizing the polymer particles according to the present embodiment. Specifically, a monomer mixture containing the above-mentioned hydrophobic monomers is dropped into an aqueous dispersion medium containing a shell polymer to obtain a core polymer by polymerization, and the obtained core polymer is formed into polymer particles. As such, when a shell polymer is used as the polymerization field of a core polymer, there is no need to use an emulsifier in the monomer mixture.

According to such a soap-free polymerization, the content of an emulsifier in the ink composition can be easily set to 0.01 mass % or less, and the average particle diameter of the polymer particles can also be adjusted very small.

Cyclic Nitrogen Compound and Aprotic Polar Solvent

The ink composition of the present embodiment preferably further includes at least one of a cyclic nitrogen compound and an aprotic polar solvent. When the ink composition includes a cyclic nitrogen compound or an aprotic solvent, it is possible to shift the apparent glass transition temperature of the polymer particles to a low-temperature region, and it is possible to soften the core polymer and the shell polymer at a temperature lower than the original temperature, thereby improving the fixability of the ink composition onto the recording medium. Thus, in particular, when the recording medium is made of polyvinyl chloride, it is possible to improve the fixability of the ink composition onto the recording medium.

The aprotic polar solvent is not particularly limited, but examples thereof include a cyclic ketone compound, a chain ketone compound, and a chain nitrogen compound. Typical examples of the cyclic nitrogen compound and the aprotic polar solvent include a pyrrolidone-based solvent, an imidazolidinone-based solvent, a sulfoxide-based solvent, a lactone-based solvent, and an amide ether-based solvent. Among these, 2-pyrrolidone, N-alkyl-2-pyrrolidone, 1-alkyl-2-pyrrolidone, γ-butyrolactone, 1,3-dimethyl-2-imidazolidinone, dimethyl sulfoxide, imidazole, 1-methylimidazole, 2-methylimidazole, and 1,2-dimethyl imidazole are preferable.

The content of the cyclic nitrogen compound and the aprotic polar solvent is not particularly limited, but is preferably 5.0 mass % to 35 mass %, and more preferably 8 mass % to 30 mass %, based on the total amount of the ink composition.

Other Solvents

The ink of the present embodiment may further include other solvents except for the above-mentioned solvents. The other solvents except for the above-mentioned solvents are not particularly limited, but specific examples thereof include alcohols and glycols, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. These other solvents may be used alone or in a combination of two or more thereof.

The boiling point of each of the other solvents is preferably 140° C. to 280° C., more preferably 160° C. to 260° C., and still more preferably 180° C. to 240° C. When the boiling point of each of the other solvents is within the above range, intermittent characteristics tend to be improved.

The content of each of the other solvents is preferably 5.0 mass % to 25 mass %, and more preferably 10 mass % to 20 mass %, based on the total amount of the ink composition.

Surfactant

It is preferred that the ink composition used in the present embodiment contain a surfactant. The surfactant is not particularly limited, but examples thereof include an acetylene glycol-based surfactant, a fluorine-based surfactant, and a silicone-based surfactant. When the ink composition contains these surfactants, the dryness of the ink composition adhered to the recording medium becomes better, and high-speed printing can be conducted.

Among these, a silicone-based surfactant is more preferable because the solubility thereof in the ink composition increases to reduce the generation of foreign matter.

The acetylene glycol-based surfactant is not particularly limited, but, for example, is preferably one or more selected from alkylene oxide adducts of 2,4,7,9-tetramethyl-5-decyne-4,7-diol and 2,4,7,9-tetramethyl-5-decyne-4,7-diol; and alkylene oxide adducts of 2,4-dimethyl-5-decyne-4-ol and 2,4-dimethyl-5-decyne-4-ol. Commercially available products of the acetylene glycol-based surfactant are not particularly limited, but examples thereof include E series such as Olfine 104 series and Olfine E1010 (all are trade names, manufactured by Air Products Japan, Inc.), and Surfynol 465 and Surfynol 61 (all are trade names, manufactured by Nissin Chemical Industry Co., Ltd.). These acetylene glycol-based surfactants may be used alone or in a combination of two or more thereof.

The fluorine-based surfactant is not particularly limited, but examples thereof include perfluoroalkyl sulfonates, perfluoroalkyl carboxylates, perfluoroalkyl phosphate esters, perfluoroalkyl ethylene oxide adducts, perfluoroalkyl betaine, perfluoroalkyl amine oxide compounds. Commercially available products of the fluorine-based surfactant are not particularly limited, but examples thereof include S-144 and S-145 (manufactured by Asahi Glass Co., Ltd.); FC-170C, FC-430, and Florad-FC4430 (manufactured by Sumitomo 3M Co., Ltd.); FSO, FSO-100, FSN, FSN-100, and FS-300 (manufactured by Dupont Inc.); and FT-250 and FT-251 (manufactured by Neos Co., Ltd.). These fluorine-based surfactants may be used alone or in a combination of two or more thereof.

Examples of the silicone-based surfactant include polysiloxane compounds, polyether-modified organosiloxane, and the like. Commercially available products of the silicone-based surfactant are not particularly limited, but specific examples thereof include BYK-306, BYK-307, BYK-333, BYK-341, BYK-345, BYK-346, BYK-347, BYK-348, and BYK-349 (all are trade names, manufactured by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade names, manufactured by Shin-Etsu chemical Co., Ltd.).

The content of the surfactant is preferably 0.1 mass % to 5 mass %, and more preferably 0.1 mass % to 3.0 mass %, based on the total amount of the ink composition. When the content of the surfactant is within the above range, the wettability of the ink composition adhered to the recording medium tends to be further improved.

Alkyl Polyol Having a Normal Boiling Point of Higher than or Equal to 280° C.

It is preferred that the ink composition of the present embodiment not substantially contain an alkyl polyol having a normal boiling point of higher than or equal to 280° C. When this ink composition does not substantially contain an alkyl polyol having a normal boiling point of higher than or equal to 280° C., the quick-drying of the ink composition on the recording medium is further improved. Meanwhile, the storage stability of ink in an ejection head can be sufficiently secured by using the polymer particles having a core-shell structure according to the present embodiment. The alkyl polyol having a normal boiling point of higher than or equal to 280° C. is not particularly limited, but an example thereof includes glycerin. The sentence "this ink composition does not substantially contain an alkyl polyol having a normal boiling point of higher than or equal to 280° C." means that the content of the alkyl polyol having a normal boiling point of higher than or equal to 280° C. is preferably 0 mass % to 0.50 mass %, and more preferably 0 mass %, based on the total amount of the ink composition.

Other Components

The ink of the present embodiment may be appropriately added with various additives, such as a dissolution aid, a viscosity modifier, an antioxidant, a preservative, a fungicide, a defoamer, a corrosion inhibitor, and the like, in addition to the above components.

It is preferred that the ink composition of the present embodiment be recorded on a heated recording medium. When the above-mentioned heated recording medium is used, it is possible to form an image having excellent frictional resistance. In addition, in the case where the recording medium is heated, a head is warmed by radiant heat thereof. According to the ink composition of the present embodiment, even when the head is warmed, the clogging of nozzles can be suppressed, and the ejection stability of the ink composition can be improved. The heating temperature is preferably higher than or equal to 35° C., more preferably higher than or equal to 40° C. and lower than or equal to 110° C., and still more preferably higher than or equal to 45° C. and lower than or equal to 120° C.

In order to heat the recording medium, for example, a platen heater or infrared radiation is used. In addition, it is preferred that the ink composition of the present embodiment be an ink composition used in an ink jet recording method from the viewpoint of more effectively and reliably exhibiting the actions and effects of the invention.

Production Method of Ink

The ink of the present embodiment can be obtained by mixing the above-mentioned components (materials) in any order and filtering the mixture if necessary to remove impurities. Here, it is preferred in terms of convenience of handling that pigment be previously prepared in a state of being uniformly dispersed in a solvent, and be then mixed with other components.

As the method of mixing the components, methods of sequentially putting the components into a container equipped with a stirring device such as a mechanical stirrer or a magnetic stirrer and then stirring and mixing these components are preferably used. As a filtration method, for example, centrifugal filtration, filtration using a filter, or the like may be conducted, if necessary.

Recording Medium

As the recording medium, an absorptive or non-absorptive recording medium is exemplified. Particularly, in the ink jet recording method, recording media having various absorption performances, from a non-absorptive recording medium, into which an aqueous ink composition does not easily permeate, to an absorptive recording medium, into which a ink composition easily permeates, can be widely applied. However, it is preferred that the recording medium be a heated medium at the time of ink ejection.

The absorptive recording medium is not particularly limited, but is particularly preferably a high-absorption recording medium such as a fabric. Examples of the fabric include, but are not limited to, natural fibers or synthetic fibers such as silk, cotton, wool, nylon, polyester, rayon, and the like.

The non-absorptive recording medium is not particularly limited, but examples thereof include a film or plate made of plastics such as polyvinyl chloride, polyethylene, polypropylene, and polyethylene terephthalate (PET); a plate made of metals such as iron, silver, copper, and aluminum; a metal plate or a plastic-made film fabricated by the deposition of these various metals; a plate made of an alloy of stainless steel or brass; and the like. In addition, it is preferred that the non-absorptive recording medium have neither an ink absorbing layer composed of silica particles or alumina particles nor an ink absorbing layer composed of a hydrophilic polymer such as polyvinyl alcohol (PVA), polyvinyl pyrrolidone (PVP), or the like.

Recording Apparatus

The recording apparatus according to the present embodiment includes an ejection head for ejecting the ink composition onto a recording medium; a heating unit for heating the recording medium; and a drying unit for drying the ink composition for ink jet adhered to the recording medium. This recording apparatus may further have the above-mentioned ink composition for ink jet.

FIGURE is a schematic cross-sectional view of a recording apparatus according to the present embodiment. As shown in FIGURE, the recording apparatus 1 includes an ejection head 2, an IR heater 3, a platen heater 4, a curing heater 5, a cooling fan 6, a preheater 7, and a ventilation fan 8.

The ejection head 2 ejects the ink composition onto the recording medium. As the ejection head 2, an ejection head known in the related art may be used. As an example of the known ejection head, there is an ejection head for ejecting liquid droplets using the vibration of a piezoelectric element, that is, an ejection head for forming ink droplets by mechanical deformation of an electrostrictive element.

The recording medium heating unit serves to heat the recording medium at the time of ejecting the ink composition from the ejection head 2. The recording medium heating unit is not particularly limited, but examples thereof include a unit for directly heating the ejection head 2 by hot air or the IR heater 3 and a unit for heating the ejection head 2 through the recording medium heated by the platen heater 4.

In addition, when the IR heater 3 is used, the recording medium can be heated from the side of the ejection head 2. Therefore, the ejection head 2 is also heated simultaneously, but the temperature of the recording medium can be increased without being affected by the thickness of the recording medium, compared to when the recording medium is heated from the back side thereof by the platen heater 4 or the like. Further, when the platen heater 4 is used, the recording medium can be heated from the side opposite to the side of the ejection head 2. Thus, the ejection head 2 becomes relatively difficult to heat.

Preferably, at the time of ejecting the ink composition onto the recording medium, the recording apparatus 1 further includes a recording medium heating unit for heating a recording medium such that the surface temperature of the recording medium is higher than or equal to 35° C. More preferably, the surface temperature thereof is higher than or equal to 35° C. and lower than or equal to 60° C. The recording medium heating unit is not particularly limited, but examples thereof include the IR heater 3 and a platen heater 4. When the recording apparatus 1 includes the recording medium heating unit, the ink composition adhered to the recording medium can be rapidly dried, and bleeding can be further suppressed.

The drying unit serves to heat and dry the recording medium coated with the ink composition for ink jet. The drying unit is not particularly limited, but examples thereof include the curing heater 5, a hot air mechanism (not shown), and a thermostatic bath (not shown). When the drying unit heats the recording medium on which an image is recorded, moisture or the like contained in the ink composition is more rapidly volatilized and scattered, and thus a film is formed by the polymer particles contained in the ink composition. In this way, dried ink matter is strongly fixed (adhered) on the recording medium, and thus a high-quality image having excellent frictional resistance can be obtained in a short time. The temperature of the drying unit is preferably higher than that of the recording medium heating unit, more preferably higher than or equal to 70° C., and still more preferably higher than or equal to 70° C. and lower than or equal to 110° C.

In addition, the above described "heating the recording medium" refers to raising the temperature of the recording medium to desired temperature, and is not limited to directly heating the recording medium.

The recording apparatus 1 may have the cooling fan 6. When the ink composition on the recording medium is cooled by the cooling fan 6 after the drying, a film having excellent adhesivity can be formed on the recording medium.

In addition, the recording apparatus 1 may include the preheater 7 for previously heating (preheating) the recording medium before the ejection of the ink composition onto the recording medium. Further, the recording apparatus 1 may include the ventilation fan 8 for more efficiently drying the ink composition adhered to the recording medium.

EXAMPLES

Hereinafter, Examples of the above-mentioned ink composition according to the invention will be described in detail, but the invention is not limited thereto.

Example 1

Preparation of Aqueous Core-Shell Polymer Particle Dispersion 100 parts of ion exchange water was put into a reactor equipped with a dropping device, a thermometer, a water-cooling reflux condenser, and a stirrer, and 0.2 parts of ammonium persulfate as a polymerization initiator was added under a nitrogen atmosphere of 70° C. with stirring, and then a monomer solution containing 20 parts of styrene, 17 parts of methyl acrylate, 30 parts of methyl methacrylate and 5 parts of acrylic acid was dropped into the reactor to prepare a shell polymer by a polymerization reaction. Thereafter, a mixed solution of 0.2 parts of potassium persulfate, 50 parts of styrene and 22 parts of n-butyl acrylate was dropped and polymerized with stirring at 70° C., and then the resultant product was neutralized with sodium hydroxide to adjust pH to 8 to 8.5, and filtered by a filter of 0.3 μm to obtain an aqueous core-shell polymer particle dispersion.

The differential scanning calorimetry (DSC) of the obtained core-shell polymer particles was carried out based on JIS K7121 to obtain the glass transition temperature Tg (° C.) of each of a polymer constituting the core polymer and a polymer constituting the shell polymer. The model "DSC6220", manufactured by Seiko Electronics Industrial Co., Ltd., was used as a differential scanning calorimeter.

In addition, the obtained core-shell polymer particles were measured by Microtrac UPA (manufactured by Nikkiso Co., Ltd.) to obtain the particle diameters φ (nm) of the core-shell polymer particles.

Preparation of Ink Composition
(1) Preparation of Pigment Dispersion

First, after a reactor equipped with a stirrer, a thermometer, a reflux tube, and a dropping funnel was charged with nitrogen, 20 parts of benzyl methacrylate, 5 parts of 2-ethylhexyl methacrylate, 15 parts of butyl methacrylate, 10 parts of lauryl methacrylate, 2 parts of methacrylic acid, and 0.3 parts of t-dodecyl mercaptan were put into the reactor and heated to 70° C. Subsequently, the separately prepared 150 parts of benzyl methacrylate, 15 parts of acrylic acid, 50 parts of butyl methacrylate, 1 part of t-dodecyl mercaptan, 20 parts of methyl ethyl ketone, and 1 part of azobisisobutyronitrile were put into the dropping funnel, and the polymerization reaction of the dispersed polymer was conducted over 4 hours while dropping them into the reactor. Next, methyl ethyl ketone was added to the reactor to prepare a dispersed polymer solution having a concentration of 40%.

The styrene-converted molecular weight of the dispersed polymer, which was measured using the Gel permeation chromatography (GPC) of L7100 system (manufactured by Hitachi Ltd.) under the condition that a part of the dispersed polymer was used and THF was used as a solvent, is 50000. In addition, the value of distribution (Mw/Mn) of molecular weight is 3.1.

Further, 40 parts of the dispersed polymer solution was mixed with 30 parts of Chromo Fine Blue C. I. Pigment Blue15:3 (trade name, manufactured by Dainichiseika Color & Chemicals Co., Ltd.), as a cyan pigment, 100 parts of a 0.1 mol/L aqueous sodium hydroxide solution, and 30 parts of methyl ethyl ketone, and then the 8-pass dispersion treatment of the mixture was carried out by ULTIMIZER 25005 (manufactured by Sugino Machine Ltd.). Thereafter, 300 parts of ion exchange water was added thereto, the total amount of methyl ethyl ketone and a part of water were distilled by a rotary evaporator, and the resulting product was neutralized with 0.1 mol/L sodium hydroxide to adjust pH to 9. The resulting product was dispersed until the volume average particle diameter of the cyan pigment became 100 nm while the volume average particle diameter of the cyan pigment was measured with a particle size distribution meter, and then filtered by a membrane filter of 3 μm to obtain a pigment dispersion liquid having a solid content of 20% (dispersed polymer and pigment).

(2) Preparation of Ink Composition

The obtained pigment dispersion liquid was added to the reactor such that the content of pigment was 2 parts by mass, the obtained core-shell polymer particle dispersion were added thereto such that the solid content thereof was 1 part by mass, and 6 parts by mass of 1,2-hexanediol, 19 parts by mass of 2-pyrrolidone, 10 parts by mass of propylene glycol, 1 part by mass of surfactant (trade name: "BYK-348", manufactured by BYK Japan K.K), and pure water were added such that the total thereof became 100 parts by mass. Then, this mixture was stirred for 2 hours by a magnetic stirrer, and then filtered by a PTFE-made membrane filter with a pore size of 5 μm to obtain an ink composition.

Examples 2 to 9 and Comparative Examples 1 to 4

Core-shell polymer particles were prepared and evaluated in the same manner as Example 1, except that the monomer composition ratios of core polymer and shell polymer were changed as given in Table 1 below at the time of preparing core-shell polymer particles.

Evaluation Result

The monomer composition ratios of the core polymer and shell polymer prepared in each of Examples and each of Comparative Examples and the physical properties of the polymer particles (particle diameter φ, content (%) of core polymer and shell polymer, Tg of core polymer and shell polymer, acid value of shell polymer, difference in Tg between core polymer and shell polymer, and mass ratio of core polymer and shell polymer) are shown in Table 1.

Evaluation Method

1. Frictional Resistance Test

A part of the printer PX-G930 (manufactured by Seiko Epson Corporation) was modified to be a printer which can adjust the heating of a recording medium at the time of ink jet recording. The ink cartridge of this printer was filled with the obtained ink composition. Then, the ink was ejected onto an A4-size vinyl chloride coated paper at a resolution of vertical 720 dpi×horizontal 720 dpi and dried to fabricate a cyan fully painted printing sample. In addition, at the time of ink jet recording, the recording medium was heated to 100° C. to be dried. Thereafter, this printing sample was left at room temperature for 16 hours.

Subsequently, a 50 round-trip test (JIS P 8136) for the obtained printing sample was conducted under a load of 500 g using a color fastness rubbing tester AB-301 (manufactured by TESTER Sangyo Co., Ltd.). Both of dry friction test and wet friction test were conducted using the calico No. 3 cloth. In the test of the printing sample of a width of 2 cm and a stroke of 12 cm, this test was evaluated in 11 steps of 0 to 10. In addition, evaluation criteria are as follows. Evaluation results are shown in Table 1.

Evaluation Criteria

10: There is no scratching or stripping.
9: There is scratching or stripping of more than or equal to 1% of stroke area.
8: There is scratching or stripping of more than or equal to 1% and less than 3% of stroke area.
7: There is scratching or stripping of more than or equal to 3% and less than 5% of stroke area.
6: There is scratching or stripping of more than or equal to 5% and less than 10% of stroke area.
5: There is scratching or stripping of more than or equal to 10% and less than 20% of stroke area.
4: There is scratching or stripping of more than or equal to 20% and less than 40% of stroke area.
3: There is scratching or stripping of more than or equal to 40% and less than 60% of stroke area.
2: There is scratching or stripping of more than or equal to 60% and less than 80% of stroke area.
1: There is scratching or stripping of more than or equal to 80% and less than 100% of stroke area.
0: The entire stroke area is stripped.

2. Ejection Stability Test 1

In the same manner as in the above preparation of the printing sample, continuous printing was conducted under an environment of a relative humidity of 20% at a temperature of 40° C. to test ejection stability. The "ejection stability" is referred to as the property that always stable ink droplets are ejected form a nozzle without clogging the nozzle. Evaluation criteria are as follows. Evaluation results are shown in Table 1.

Evaluation Criteria

A: Non-ejection or ejection disturbance is not observed at all during the continuous ejection test for 8 hours.
B: Non-ejection or ejection disturbance is not observed for more than or equal to 2 hours and less than 8 hours during the continuous ejection test for 8 hours.
C: Non-ejection or ejection disturbance is not observed for more than or equal to 1 hour and less than 2 hours during the continuous ejection test for 8 hours.
D: Non-ejection or ejection disturbance is observed for less than 1 hour during the continuous ejection test for 8 hours.

3. Ejection Stability Test 2

The evaluation of ejection stability in the intermittent printing was conducted under an environment of a relative humidity of 20% at a temperature of 40° C. using the printer used in Example 1. First, it was confirmed that ink is normally ejected from all nozzles. And, down-time for 2 minutes was provided under an environment of a relative humidity of 20% at a temperature of 40° C., and then, in the ejection by first droplet, the positional deviation of dots from the target value was measured by an optical microscope. Evaluation criteria are as follows. Evaluation results are shown in Table 1.

Evaluation Criteria

A: Positional deviation of dots is less than or equal to 10 μm.
B: Positional deviation of dots is more than 10 μm and less than or equal to 20 μm.
C: Positional deviation of dots is more than 20 μm and less than or equal to 30 μm.
D: Positional deviation of dots is more than 30 μm.

TABLE 1

|  |  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Core | Styrene (80° C.) | 50 | 20 | 50 | 50 | 20 | 40 | 50 | 50 | 50 |
|  | Benzyl methacrylate (54° C.) | 0 | 30 | 0 | 0 | 0 | 10 | 0 | 0 | 0 |
|  | Benzyl acrylate (6° C.) | 0 | 0 | 0 | 10 | 0 | 0 | 0 | 0 | 0 |
|  | n-butyl methacrylate (20° C.) | 0 | 0 | 0 | 0 | 0 | 10 | 0 | 0 | 0 |
|  | n-butyl acrylate (−55° C.) | 22 | 22 | 30 | 33 | 10 | 11 | 28 | 28 | 30 |
|  | Acrylic acid (106° C.) | 0 | 0 | 0 | 0 | 0 | 0 | 0 | 0 | 0 |
|  | Acrylonitrile (125° C.) | 0 | 0 | 0 | 0 | 0 | 1 | 2 | 0 | 0 |
|  | Dimethyl acrylamide (119° C.) | 0 | 0 | 0 | 0 | 0 | 0 | 0 | 2 | 0 |
| Shell | Styrene (80° C.) | 20 | 30 | 40 | 20 | 30 | 20 | 40 | 40 | 40 |
|  | Benzyl methacrylate (54° C.) | 0 | 0 | 10 | 0 | 10 | 0 | 10 | 10 | 10 |
|  | Methyl acrylate (10° C.) | 17 | 12 | 15 | 0 | 12 | 17 | 10 | 10 | 10 |
|  | Ethyl acrylate (−24° C.) | 0 | 5 | 0 | 0 | 0 | 0 | 0 | 0 | 0 |
|  | Methyl methacrylate (105° C.) | 30 | 20 | 50 | 14 | 0 | 25 | 50 | 50 | 50 |
|  | Eethyl methacrylate (65° C.) | 0 | 0 | 0 | 0 | 10 | 0 | 0 | 0 | 0 |
|  | Acrylic acid (106° C.) | 5 | 5 | 5 | 0 | 8 | 5 | 5 | 10 | 5 |
|  | Methacrylic acid (227° C.) | 0 | 0 | 0 | 6 | 0 | 0 | 0 | 0 | 0 |
|  | Hydroxyethyl methacrylate (55° C.) | 0 | 0 | 0 | 0 | 0 | 5 | 0 | 0 | 0 |
|  | Hydroxyethyl actylamide (98° C.) | 0 | 0 | 0 | 0 | 0 | 0 | 5 | 0 | 5 |

TABLE 1-continued

| | | | | | | | | | | |
|---|---|---|---|---|---|---|---|---|---|---|
| Physical properties | Particle diameter (nm) | 35 | 41 | 36 | 47 | 38 | 60 | 66 | 80 | 35 |
| | Core content (mass %) | 50 | 50 | 40 | 70 | 30 | 50 | 40 | 40 | 40 |
| | Shell content (mass %) | 50 | 50 | 60 | 30 | 70 | 50 | 60 | 60 | 60 |
| | Core Tg (° C.) | 39 | 28 | 29 | 24 | 35 | 48 | 34 | 34 | 29 |
| | Shell Tg (° C.) | 76 | 70 | 81 | 111 | 65 | 72 | 84 | 85 | 84 |
| | Shell acid value mgKOH/g | 54 | 54 | 49 | 97 | 89 | 54 | 49 | 98 | 49 |
| | Core Tg – Shell Tg | 37 | 42 | 52 | 87 | 30 | 18 | 50 | 51 | 35 |
| | Core mass %/shell mass % | 1 | 1 | 0.67 | 2.35 | 0.43 | 1 | 0.67 | 0.67 | 0.67 |
| Evaluation | Frictional resistance test result | 8 | 8 | 8 | 8 | 8 | 9 | 0 | 0 | 8 |
| | Ejection stability test 1 | A | A | A | B | A | B | B | B | A |
| | Ejection stability test 2 | A | A | A | A | A | A | B | B | A |

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Core | Styrene (80° C.) | 50 | 50 | 50 | 45 | 50 | 22 |
| | Benzyl methacrylate (54° C.) | 0 | 0 | 0 | 0 | 0 | 0 |
| | Benzyl acrylate (6° C.) | 0 | 0 | 0 | 0 | 0 | 0 |
| | n-butyl methacrylate (20° C.) | 0 | 0 | 0 | 0 | 22 | 0 |
| | n-butyl acrylate (−55° C.) | 22 | 22 | 22 | 22 | 0 | 50 |
| | Acrylic acid (106° C.) | 0 | 0 | 0 | 5 | 0 | 0 |
| | Acrylonitrile (125° C.) | 0 | 0 | 0 | 0 | 0 | 0 |
| | Dimethyl acrylamide (119° C.) | 0 | 0 | 0 | 0 | 0 | 0 |
| Shell | Styrene (80° C.) | 20 | 20 | 20 | 20 | 20 | 20 |
| | Benzyl methacrylate (54° C.) | 0 | 0 | 0 | 0 | 0 | 0 |
| | Methyl acrylate (10° C.) | 17 | 17 | 17 | 17 | 17 | 30 |
| | Ethyl acrylate (−24° C.) | 0 | 0 | 0 | 0 | 0 | 15 |
| | Methyl methacrylate (105° C.) | 30 | 30 | 30 | 30 | 30 | 15 |
| | Eethyl methacrylate (65° C.) | 0 | 0 | 0 | 0 | 0 | 0 |
| | Acrylic acid (106° C.) | 5 | 5 | 5 | 5 | 5 | 5 |
| | Methacrylic acid (227° C.) | 0 | 0 | 0 | 0 | 0 | 0 |
| | Hydroxyethyl methacrylate (55° C.) | 0 | 0 | 0 | 0 | 0 | 0 |
| | Hydroxyethyl actylamide (98° C.) | 0 | 0 | 0 | 0 | 0 | 0 |
| Physical properties | Particle diameter (nm) | 150 | 85 | 9 | 35 | 37 | 45 |
| | Core content (mass %) | 50 | 50 | 50 | 50 | 50 | 50 |
| | Shell content (mass %) | 50 | 50 | 50 | 50 | 50 | 50 |
| | Core Tg (° C.) | 39 | 39 | 39 | 41 | 62 | −14 |
| | Shell Tg (° C.) | 76 | 76 | 76 | 76 | 76 | 49 |
| | Shell acid value mgKOH/g | 54 | 54 | 54 | 54 | 54 | 54 |
| | Core Tg – Shell Tg | 37 | 37 | 42 | 35 | 14 | 90 |
| | Core mass %/shell mass % | 1 | 1 | 1 | 1 | 1 | 1 |
| Evaluation | Frictional resistance test result | 3 | 4 | 5 | 2 | 8 | 2 |
| | Ejection stability test 1 | C | C | D | D | B | C |
| | Ejection stability test 2 | C | C | D | C | C | D |

From test results of the ink compositions for ink jet recording of Examples 1 to 9, it was found that the ejection stability thereof from the nozzle of a recording head become good, and the frictional resistance of the image recorded on a recording medium becomes good. In addition, the fact that the frictional resistance in the ink compositions of Examples was improved shows that the fixability thereof was also improved.

In the ink composition for ink jet recording of Comparative Example 1, unlike Example 1, polymer particles having a large particle diameter of 150 nm are obtained, and thus sufficient frictional resistance and ejection stability cannot be obtained, because commonly known emulsion polymerization, in which an emulsifier (sodium dodecylbenzene sulfonate) is added to the raw materials of Example 1 in an amount of 1 part to perform polymerization, is used.

In the ink composition for ink jet recording of Comparative Example 2, polymer particles has a large particle diameter of 85 nm, and thus sufficient frictional resistance and ejection stability cannot be obtained, because the amount of a polymerization initiator is reduced to $\frac{1}{5}$ to increase polymerization time by three times although using soap-free polymerization.

In the ink composition for ink jet recording of Comparative Example 3, polymer particles has a small particle diameter of 9 nm, and thus sufficient frictional resistance and ejection stability cannot be obtained, because the amount of a polymerization initiator is increased by ten times to reduce polymerization time to $\frac{1}{5}$.

In the ink composition for ink jet recording of Comparative Example 4, sufficient frictional resistance cannot be obtained, and ejection stability is poor, because a core polymer has an acid value.

In the ink composition for ink jet recording of Comparative Example 5, frictional resistance is good, but sufficient ejection stability cannot be obtained, because Tg of any one of core polymer and shell polymer is higher than or equal to 60° C.

In the ink composition for ink jet recording of Comparative Example 6, sufficient frictional resistance cannot be obtained, and ejection stability is also poor, because Tg of any one of core polymer and shell polymer is lower than 60° C.

The entire disclosure of Japanese Patent Application No. 2014-038426, filed Feb. 28, 2014 is expressly incorporated by reference herein.

What is claimed is:

1. An ink composition, comprising:
   a color material;
   water; and
   a polymer particle,
   wherein the polymer particle has a core-shell structure including a core polymer and a shell polymer,
   wherein the polymer particle has an average particle diameter of 10 nm to 80 nm,
   wherein the core polymer has a glass transition temperature of lower than 60° C., and the shell polymer has a glass transition temperature of higher than or equal to 60° C., wherein the core polymer includes an aromatic monomer having at least a vinyl group as a constitutional unit, wherein the shell polymer includes an aromatic monomer as a constitutional unit, and wherein the shell polymer has an acid value, and the core polymer does not have an acid value.

2. The ink composition according to claim 1, which is recorded on a heated recording medium.

3. The ink composition according to claim 1, wherein the polymer particle is synthesized without substantially using an emulsifier.

4. The ink composition according to claim 1, further comprising a cyclic nitrogen compound or an aprotic polar solvent, wherein the recording medium is made of polyvinyl chloride.

5. The ink composition according to claim 1, wherein the core polymer includes a nitrogen-containing monomer, and the recording medium is made of polypropylene, polyethylene terephthalate, nylon, or polyethylene.

6. The ink composition according to claim 1, wherein the shell polymer includes (meth)acrylic acid as a constitutional unit.

7. The ink composition according to claim 1, wherein the shell polymer has an acid value of 20 mgKOH/g to 120 mgKOH/g.

8. A recording apparatus, comprising:

composition according to claim 1; and an ejection head for ejecting the ink composition.

9. A recording apparatus, comprising:

composition according to claim 2; and an ejection head for ejecting the ink composition.

10. A recording apparatus, comprising:

composition according to claim 3; and an ejection head for ejecting the ink composition.

11. A recording apparatus, comprising:

composition according to claim 4; and an ejection head for ejecting the ink composition.

12. A recording apparatus, comprising:

composition according to claim 5; and an ejection head for ejecting the ink composition.

13. A recording apparatus, comprising:

composition according to claim 6; and an ejection head for ejecting the ink composition.

14. A recording apparatus, comprising:

composition according to claim 7; and an ejection head for ejecting the ink composition.

15. The recording apparatus according to claim 8, wherein the ejection head includes nozzles for ejecting the ink composition, and dots of the ink composition are ejected in a multi-size from one of the nozzles.

16. The recording apparatus according to claim 9, wherein the ejection head includes nozzles for ejecting the ink composition, and dots of the ink composition are ejected in a multi-size from one of the nozzles.

17. The recording apparatus according to claim 10, wherein the ejection head includes nozzles for ejecting the ink composition, and dots of the ink composition are ejected in a multi-size from one of the nozzles.

18. An ink composition, comprising:

a color material;

water; and a polymer particle, wherein the polymer particle has a core-shell structure including a core polymer and a shell polymer, wherein the polymer particle has an average particle diameter of 10 nm to 80 nm, wherein the core polymer has a glass transition temperature of lower than 60° C., and the shell polymer has a glass transition temperature of higher than or equal to 60° C., wherein the core polymer includes an aromatic monomer having at least a vinyl group as a constitutional unit; and wherein the polymer particle is synthesized without substantially using an emulsifier.

19. The ink composition according to claim 18, which is recorded on a heated recording medium.

20. The ink composition according to claim 18, further comprising a cyclic nitrogen compound or an aprotic polar solvent, wherein the recording medium is made of polyvinyl chloride.

21. The ink composition according to claim 18, wherein the core polymer includes a nitrogen-containing monomer, and the recording medium is made of polypropylene, polyethylene terephthalate, nylon, or polyethylene.

22. The ink composition according to claim 18, wherein the shell polymer includes (meth)acrylic acid as a constitutional unit.

23. The ink composition according to claim 18, wherein the shell polymer has an acid value of 20 mgKOH/g to 120 mgKOH/g.

24. A recording apparatus, comprising:

composition according to claim 18; and an ejection head for ejecting the ink composition.

* * * * *